(No Model.)
E. GLENDILLEN.
HORSE HAY RAKE.
No. 289,082. Patented Nov. 27, 1883.
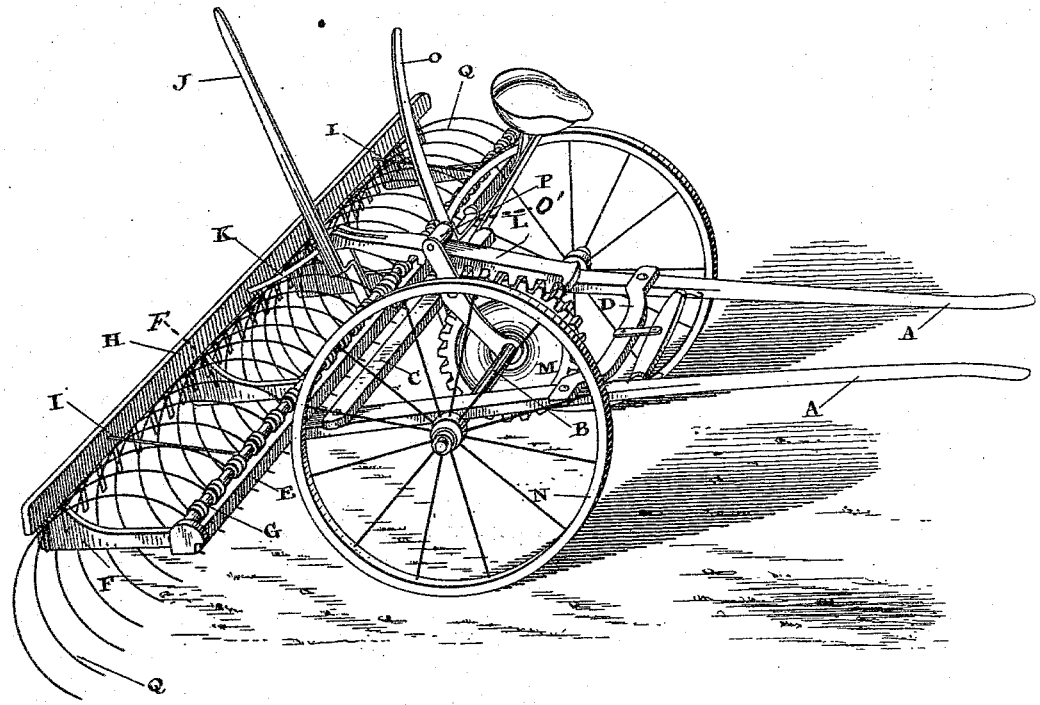
Fig. 1.
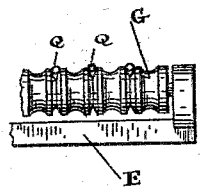
Fig. 2.
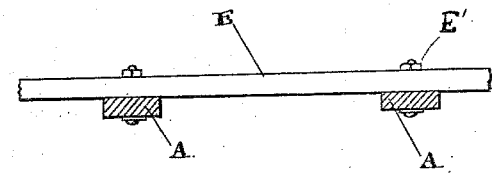
Fig. 3.
Fig. 2ª.
Witnesses.
Lewis Tomlinson
J. B. Fetherstonhaugh
Inventor.
Elijah Glendillen
by Donald C. Ridout & Co.
Attorneys

UNITED STATES PATENT OFFICE.

ELIJAH GLENDILLEN, OF OWEN SOUND, ONTARIO, CANADA.

HORSE HAY-RAKE.

SPECIFICATION forming part of Letters Patent No. 289,082, dated November 27, 1883.

Application filed April 3, 1883. (No model.)

*To all whom it may concern:*

Be it known that I, ELIJAH GLENDILLEN, of the town of Owen Sound, in the county of Grey, in the Province of Ontario, Dominion of Canada, have invented certain new and useful Improvements in Horse-Rakes, of which the following is a specification.

This invention relates to certain new and useful improvements in horse-rakes; and it consists in the peculiar construction, arrangement, and combination of parts, as hereinafter more fully described, and then pointed out in the claims.

In the drawings, Figure 1 is a perspective view of the machine. Fig. 2 is an enlarged detail showing the V-shaped grooves for holding the rake-teeth. Fig. 3 is an enlarged detail showing the manner of connecting the rake-frame to the body of the machine. Fig. 2ª is a side view of the parts shown in Fig. 2.

In the drawings like letters indicate corresponding parts in all of the figures.

A are two side timbers shaped to form the shafts of the machine, and extending back so as to form the side bars of the frame, upon which the bearing-boxes are attached.

C is a cross-timber binding together the rear of the timbers A.

D is a front cross-timber, to which the whiffletree is attached.

E is a rake-frame timber bolted to the rear ends of the side timbers, A, by bolts E', (see Fig. 3,) which, while holding the rake-frame timber E rigidly to the side timbers, A, may easily be removed when it is desired to disconnect the rake-frame from the running-gear of the vehicle. The fenders or cleaner-bars F are attached to and extend from the rake-frame timber E, which timber also carries the rake bar or head G.

H is the staple-bar, supported from the head G by the bars or rods I.

J is a hand-lever pivoted upon the rake-head G, and connected to the staple-bar H by the bar K. To this bar is also pivoted the rack-bar L, which bar extends over and is intended to gear with the cog-wheel M, which is keyed or otherwise fastened to the axle B. One of the wheels N is loose upon the axle B, while the other wheel is keyed or otherwise fastened to it, in order that the axle B shall revolve with the movement of the machine, while the loose wheel permits the machine to be more easily turned than if both wheels were rigidly fastened to the axle.

O is a hand-lever pivoted upon the axle B, and provided with friction-rollers P, one situated above and the other below the rack-bar L, in order that by the movement of said lever O the rack-bar L may be thrown in or out of gear with the cog-wheel M.

It is well known that in new districts, where farm-vehicles are scarce, the horse-rake belonging to the farm is frequently utilized for carrying passengers across the country. Owing to the width of gage of ordinary horse-rakes, necessitated by the position of the rake bar or head, an ordinary horse-rake is extremely hard on the horses when driven fast, and, moreover, owing to the great width of the gages, the rake is not only difficult to turn, but cannot be driven in an ordinary track made by other vehicles.

By connecting the rake-teeth to an independent rake-frame situated in the rear of the wheels of the machine, I am enabled to provide a machine with as many rake-teeth as desired, while the gage of the wheels N may be reduced to correspond with the width of the track made by ordinary vehicles. I am, moreover, able, by making the rake-frame detachable from the running-gear of the machine, to utilize that running-gear for an ordinary vehicle when not required for use with the rake. This change may be accomplished by simply removing the bolts E', when the rake-frame E can be lifted off the timbers A, the rack-bar L being also detachable. When the rake-gear is thus removed, the timbers A, C, and D may be utilized for the purpose of supporting a vehicle-body provided with seats for carrying passengers. In order that the rake-teeth Q may be tightened upon the rake-head when the said rake-teeth are in the act of raking, I provide for each tooth, in lieu of the U-shaped groove usually employed, a V-shaped groove (see Fig. 2) formed in the rake-head G, into which groove the end of the tooth is curved to fit. Consequently any strain on the rake-tooth will compress its end into the V-shaped groove, and thereby tighten its hold on the rake-head.

By throwing the lever O back in the position indicated in Fig. 1, the rack-bar L is caused to fall into gear with the cog-wheel M, which, being in motion when the rake is drawn forward, will impart a forward movement to the rack-bar L, thereby causing the movement of the machine to dump the rake without any exertion on the part of the driver.

Should it at any time be necessary to dump the rake by hand, the driver can accomplish this by drawing upon the hand-lever J.

It is scarcely necessary to mention that by throwing forward the hand-lever O the rack-bar L is thrown out of gear with the cog-wheel M, the movement of the lever O being effected either by hand or by pressure of the driver's foot upon the foot-rest O', which, as shown, is attached to the lever O.

I am aware of Patent No. 125,630 and Reissue No. 9,133, in which U-shaped grooves are shown for the purpose of holding the rake-teeth in place, and make no claim to such construction. I deem it important that the grooves in the rake-head for the reception of the rake-teeth be made V-shaped, as shown, for a V-shaped groove will grip the tooth much better than the U-shaped groove heretofore used, and, besides, it will allow for a variation in the size of the tooth. So if one or more of the teeth be smaller in diameter than the others, they will still be firmly gripped by the wedge-shaped groove, and any strain on the tooth will compress its coiled end into the groove, and thereby always tend to tighten its hold on the rake-head, whereas a U-shaped groove would have no effect in holding a wire smaller than the semicircle at the bottom of the groove.

What I claim as my invention is—

1. A horse hay-rake in which one of the riding-wheels is rigid with the axle, the combination of the gear-wheel M, rigid on such axle, the rack-bar L, pivoted to the lever which operates the staple-bar, and the lever O, as and for the purposes set forth.

2. The combination, with the gear-wheel M and staple-bar H, of the lever J, pivoted on the rake-head, and connected to said staple-bar by the bar K, the rack-bar L, pivoted to said bar K, and the lever O, having friction-rollers P, all arranged and adapted to serve as set forth.

3. In a horse-rake, a rake-head having V-shaped grooves cut in it, in combination with rake-teeth having curled ends to fit into said V-shaped grooves, whereby any strain on the rake-teeth will compress their ends into the V-shaped grooves to tighten the teeth, as set forth.

E. GLENDILLEN.

Witnesses:
C. CLINTON BALDWIN,
F. B. FETHERSTONHAUGH.